United States Patent
Hueda et al.

(10) Patent No.: US 9,876,583 B2
(45) Date of Patent: Jan. 23, 2018

(54) TIMING RECOVERY FOR OPTICAL COHERENT RECEIVERS IN THE PRESENCE OF POLARIZATION MODE DISPERSION

(71) Applicant: INPHI CORPORATION, Santa Clara, CA (US)

(72) Inventors: Mario Rafael Hueda, Cordoba (AR); Mauro M. Bruni, Cordoba (AR); Federico Nicolas Paredes, Cordoba (AR); Hugo Santiago Carrer, Mendiolaza (AR); Diego Ernesto Crivelli, Cordoba (AR); Oscar Ernesto Agazzi, Irvine, CA (US); Norman L. Swenson, Mountain View, CA (US); Seyedmohammadreza Motaghiannezam, Los Altos, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/623,292

(22) Filed: Jun. 14, 2017

(65) Prior Publication Data

US 2017/0302385 A1 Oct. 19, 2017

Related U.S. Application Data

(63) Continuation of application No. 14/869,676, filed on Sep. 29, 2015, now Pat. No. 9,712,253, which is a (Continued)

(51) Int. Cl.
*H04B 10/00* (2013.01)
*H04B 10/61* (2013.01)
*H04L 7/00* (2006.01)

(52) U.S. Cl.
CPC ....... *H04B 10/6162* (2013.01); *H04L 7/0075* (2013.01); *H04L 7/0079* (2013.01)

(58) Field of Classification Search
CPC ... H04B 10/299; H04B 10/61; H04B 10/6162
See application file for complete search history.

(56) References Cited

U.S. PATENT DOCUMENTS

| 4,669,116 A | 5/1987 | Agazzi et al. |
| 7,894,728 B1 | 2/2011 | Sun et al. |

(Continued)

OTHER PUBLICATIONS

Moon et al: Timing Recovery in CMOS using Nonlinear Spectral-line Method, IEEE 1996 Custom Integrated Circuits Conference, 1996, pp. 13-16.

(Continued)

*Primary Examiner* — Dzung Tran
(74) *Attorney, Agent, or Firm* — Richard T. Ogawa; Ogawa P.C.

(57) ABSTRACT

A timing recovery system generates a sampling clock to synchronize sampling of a receiver to a symbol rate of an incoming signal. The input signal is received over an optical communication channel. The receiver generates a timing matrix representing coefficients of a timing tone detected in the input signal. The timing tone representing frequency and phase of a symbol clock of the input signal and has a non-zero timing tone energy. The receiver computes a rotation control signal based on the timing matrix that represents an amount of accumulated phase shift in the input signal relative to the sampling clock. A numerically controlled oscillator is controlled to adjust at least one of the phase and frequency of the sampling clock based on the rotation control signal.

20 Claims, 9 Drawing Sheets

Related U.S. Application Data continuation of application No. 14/095,789, filed on Dec. 3, 2013, now Pat. No. 9,178,625.

(60) Provisional application No. 61/893,128, filed on Oct. 18, 2013, provisional application No. 61/832,513, filed on Jun. 7, 2013, provisional application No. 61/749,149, filed on Jan. 4, 2013, provisional application No. 61/732,885, filed on Dec. 3, 2012.

(56) References Cited

U.S. PATENT DOCUMENTS

| | | | |
|---|---|---|---|
| 8,244,142 B2 | 8/2012 | Wagner et al. | |
| 8,634,726 B2 | 1/2014 | Zhang et al. | |
| 8,655,191 B2 | 2/2014 | Kaneda et al. | |
| 8,712,247 B2 | 4/2014 | Hauske | |
| 2003/0058955 A1* | 3/2003 | Raghavan | H04L 27/2601 375/265 |
| 2005/0271169 A1* | 12/2005 | Momtaz | H03G 3/3084 375/345 |
| 2006/0013590 A1 | 1/2006 | Hueda et al. | |
| 2006/0285854 A1* | 12/2006 | Sun | H03L 7/085 398/155 |
| 2009/0252497 A1 | 10/2009 | Younce et al. | |
| 2010/0329677 A1 | 12/2010 | Kaneda et al. | |
| 2011/0128171 A1* | 6/2011 | Oshima | H03M 1/1028 341/120 |
| 2011/0268459 A1 | 11/2011 | Rollins et al. | |
| 2012/0096061 A1 | 4/2012 | Hauske | |
| 2012/0177156 A1 | 7/2012 | Hauske et al. | |
| 2012/0213510 A1 | 8/2012 | Stojanovic | |
| 2012/0219302 A1 | 8/2012 | Sun et al. | |
| 2012/0269513 A1 | 10/2012 | Abe | |
| 2012/0288275 A1 | 11/2012 | Zhang et al. | |
| 2013/0039665 A1 | 2/2013 | Hauske | |
| 2013/0251082 A1* | 9/2013 | Abe | H04L 1/0036 375/350 |
| 2013/0302041 A1* | 11/2013 | Matsui | H04B 10/6971 398/208 |
| 2013/0336647 A1 | 12/2013 | Le Taillandier De Gabory et al. | |
| 2014/0219666 A1* | 8/2014 | Tselniker | H04L 25/03019 398/208 |

OTHER PUBLICATIONS

Agazzi, O., et al., "Maximum-Likelihood Sequence Estimation in Dispersive Optical Channels," Journal of Lightwave Technology, vol. 23, No. 2, pp. 749-763, Feb. 2005.

Agazzi, O., et al., "Timing Recovery in Digital Subscriber Loops," IEEE Transactions on Communications, vol. COM-33, No. 6, pp. 558-569, Jun. 1985.

Crivelli, D.E., et al., "Adaptive Digital Equalization in the Presence of Chromatic Dispersion, PMD, and Phase Noise in Coherent Fiber Optic Systems," in IEEE 2004 Global Telecommunications Conference, Nov. 29-Dec. 3, 2004, vol. 4, pp. 2545-2551.

Kuschnerov, M., et al., "DSP for Coherent Single-Carrier Receivers," Journal of Lightwave Technology, vol. 27, No. 16, pp. 3614-3622, Aug. 15, 2009.

* cited by examiner

TIMING RECOVERY FOR OPTICAL COHERENT RECEIVERS IN THE PRESENCE OF POLARIZATION MODE DISPERSION

RELATED APPLICATIONS

This application is a continuation of U.S. patent application Ser. No. 14/869,676 filed on Sep. 29, 2015, which is a continuation of U.S. patent application Ser. No. 14/095,789 entitled "Timing Recovery for Optical Coherent Receivers in the Presence of Polarization Mode Dispersion" filed on Dec. 3, 2013, which claims the benefit of U.S. Provisional Application No. 61/732,885 entitled "Timing Recovery for Optical Coherent Receivers In the Presence of Polarization Mode Dispersion" filed on Dec. 3, 2012 to Mario R. Hueda, et al.; U.S. Provisional Application No. 61/749,149 entitled "Timing Recovery for Optical Coherent Receivers In the Presence of Polarization Mode Dispersion" filed on Jan. 4, 2013 to Mario R. Hueda, et al.; U.S. Provisional Application No. 61/832,513 entitled "Timing Recovery for Optical Coherent Receivers In the Presence of Polarization Mode Dispersion" filed on Jun. 7, 2013 to Mario R. Hueda, et al.; and U.S. Provisional Application No. 61/893,128 entitled "Timing Recovery for Optical Coherent Receivers In the Presence of Polarization Mode Dispersion" filed on Oct. 18, 2013 to Mario R. Hueda, et al. The contents of each of the above referenced applications are incorporated by reference herein.

BACKGROUND

1. Field of the Art

The disclosure relates generally to communication systems, and more specifically, to timing recovery in an optical receiver.

2. Description of the Related Art

The most recent generation of high-speed optical transport network systems has widely adopted receiver technologies with electronic dispersion compensation (EDC). In coherent as well as in intensity modulation direct detection (IM-DD) receivers, EDC mitigates fiber impairments such as chromatic dispersion (CD) and polarization mode dispersion (PMD). Timing recovery (TR) in the presence of differential group delay (DGD) caused by PMD has been identified as one of the most critical challenges for intradyne coherent receivers. This can result in the receiver failing to recover data received over the fiber channel, thereby decreasing performance of the optical network system.

SUMMARY

A receiver performs a timing recovery method to recover timing of an input signal. The input signal is received over an optical communication channel. In an embodiment, the optical channel may introduce an impairment into the input signal including at least one: a half symbol period differential group delay, a cascaded differential group delay, a dynamic polarization mode dispersion, and a residual chromatic dispersion. The receiver samples the input signal based on a sampling clock. The receiver generates a timing matrix representing coefficients of a timing tone detected in the input signal. The timing tone representing frequency and phase of a symbol clock of the input signal and has a non-zero timing tone energy. The receiver computes a rotation control signal based on the timing matrix that represents an accumulated phase shift of the input signal relative to the sampling clock. A numerically controlled oscillator is controlled to generate the sampling clock based on the rotation control signal.

In one embodiment, the receiver includes a resonator filter to filter the input signal to generate a band pass filtered signal. An in-phase and quadrature error signal is computed based on the band pass filter signal. The in-phase and quadrature error signal represents an amount of phase error in each of an in-phase component and a quadrature component of the input signal. The rotation control signal is computed based on the in-phase and quadrature error signal. In various embodiments, a determinant method or a modified wave difference method can be used to determine the rotation control signal based on the timing matrix.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

Overview

A receiver architecture and method for timing recovery is described for transmissions received over an optical fiber channel in the presence of differential group delay (DGD) (caused, for example, by polarization mode dispersion) that affects the detectability of a reliable timing tone. Timing recovery can then be performed on the transformed signal to recover a clock signal.

High Level System Architecture

Figure 1:
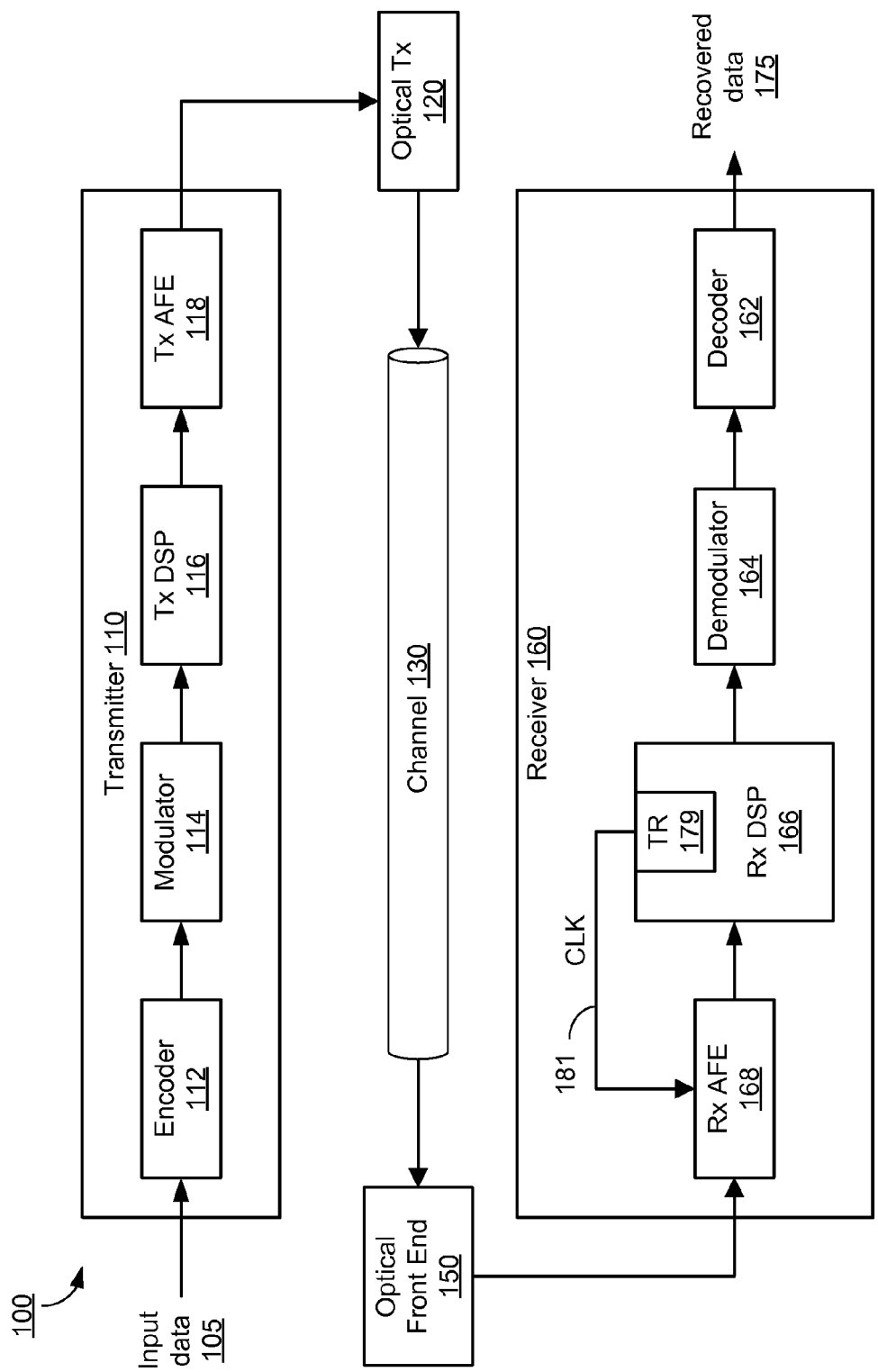
FIG. 1 is a system diagram of an embodiment of an optical communication system.

FIG. 1 is a block diagram of a communication system 100. The communication system 100 comprises a transmitter 110 for encoding data as an electrical signal, an optical transmitter 120 for converting the electrical signal produced by the transmitter 110 to an optical signal suitable for transmission over a communication channel 130, an optical front end 150 for converting the received optical signal to an electrical signal, and a receiver for receiving and processing the electrical signal encoding the data from the optical front end 150. In one embodiment, the communication system 100 comprises an ultra-high speed (e.g., 40 Gb/s or faster) optical fiber communication system, although the described techniques may also be applicable to lower speed optical communication systems.

The transmitter 110 comprises an encoder 112, a modulator 114, a transmitter (Tx) digital signal processor (DSP) 116, and Tx analog front end (AFE) 118. The encoder 112 receives input data 105 and encodes the data for transmission over the optical network. For example, in one embodiment, the encoder 112 encodes the input data 105 using forward error correction (FEC) codes that will enable the receiver 160 to detect, and in many cases, correct errors in the data received over the channel 130. The modulator 114 modulates the encoded data via one or more carrier signals for transmission over the channel 130. For example, in one embodiment, the modulator 114 applies phase-shift keying (PSK) or differential phase-shift keying (DPSK) to the encoded data. The Tx DSP 116 adapts (by filtering, etc.) the modulator's output signal according to the channel characteristics in order to improve the overall performance of the transmitter 110. The Tx AFE 118 further processes and converts the Tx DSP's digital output signal to the analog domain before it is passed to the optical transmitter (Optical Tx) 120 where it is converted to an optical signal and transmitted via the channel 130. One example of the optical transmitter 120 transmits independent modulations on both polarizations of the optical carrier. An example modulation is QPSK, though other modulations can be used, and the choice can be made to transmit on either one or both polarizations.

In addition to the illustrated components, the transmitter 110 may comprise other conventional features of a transmitter 110 which are omitted from FIG. 1 for clarity of description. Furthermore, in one embodiment, the transmitter 110 is embodied as a portion of a transceiver device that can both transmit and receive over the channel 130.

The channel 130 may have a limited frequency bandwidth and may act as a filter on the transmitted data. Transmission over the channel 130 may add noise to the transmitted signal including various types of random disturbances arising from outside or within the communication system 100. Furthermore, the channel 130 may introduce fading and/or attenuation effects to the transmitted data. Additionally, the channel 130 may introduce chromatic dispersion (CD) and polarization mode dispersion (PMD) effects that cause a spreading of pulses in the channel 130. Based on these imperfections in the channel 130, the receiver 160 is designed to process the received data and recover the input data 105.

In general, the optical front end 150 receives the optical signal, converts the optical signal to an electrical signal, and passes the electrical signal to the receiver 160. The receiver 160 receives the encoded and modulated data from the transmitter 110 via the optical transmitter 120, communication channel 130, and optical front end 150, and produces recovered data 175 representative of the input data 105. The receiver 160 includes a receiver (Rx) analog front end (AFE) 168, an RX DSP 166, a demodulator 164, and a decoder 162. The Rx AFE 168 samples the analog signal from the optical front end 150 based on a clock signal 181 to convert the signal to the digital domain. The Rx DSP 166 further processes the digital signal by applying one or more filters to improve signal quality. As will be discussed in further detail below, the Rx DSP 166 includes a timing recovery block 179 that operates to generate the sampling clock 181 and to adjust the sampling frequency and phase of the sampling clock signal 181 to ensure that the sampling clock remains synchronized with the symbol rate and phase of the incoming optical signal. This timing recovery problem becomes challenging due to the imperfections in the channel 130 that may alter the received optical signal. For example, chromatic dispersion (CD) and polarization mode dispersion (PMD) effects may cause a spreading of pulses in the channel 130, thereby increasing the difficulty of timing recovery, as will be explained below.

The demodulator 164 receives the modulated signal from the Rx DSP 166 and demodulates the signal. The decoder 162 decodes the demodulated signal (e.g., using error correction codes) to recover the original input data 105.

In addition to the illustrated components, the receiver 160 may comprise other conventional features of a receiver 160 which are omitted from FIG. 1 for clarity of description. Furthermore, in one embodiment, the receiver 160 is embodied as a portion of a transceiver device that can both transmit and receive over the channel 130.

Components of the transmitter 110 and the receiver 160 described herein may be implemented, for example, as an integrated circuit (e.g., an Application-Specific Integrated Circuit (ASIC) or using a field-programmable gate array (FPGA), in software (e.g., loading program instructions to a processor (e.g., a digital signal processor (DSP)) from a computer-readable storage medium and executing the instructions by the processor), or by a combination of hardware and software.

Impact of Channel Impairments on Timing Recovery

In order for the timing recovery block 179 to properly generate the sampling clock 181, a timing tone is detected in the digital input signal that will ideally appear at a frequency representative of the symbol rate. A common technique for timing recovery is the nonlinear spectral line method as described in J. R. Barry, E. A. Lee, and D. G. Messerschmitt, Digital Communication. KAP, third ed. 2004. In this method, a timing tone is detected in the digital input signal and the frequency of the timing tone is used to synchronize the sampling clock 181 to the incoming signal. However, under certain conditions, the timing tone can be lost or offset when using a conventional spectral line method timing recovery technique. For example, the timing tone may disappear in the presence of half-baud DGD. Furthermore, when a cascaded DGD is present, the nonlinear spectral line method may generate a timing tone with a frequency offset which causes a loss of synchronization. Other channel conditions such as general dynamic PMD and/or residual chromatic dispersion can furthermore cause the traditional spectral line method to fail due to frequency or phase offset between the symbol clock and the sampling clock.

The following description explains how the PMD is expressed mathematically, which provides a basis for an explanation of the effects of particular PMD on the timing information in the received signal. The signal from the optical front end 150 presented to the receiver 160 consists of electrical signals from both polarizations of the optical signal received by the optical front end 150. These two polarizations can be treated mathematically as a two-dimensional complex vector, where each component corresponds to one of the polarizations of the received optical signal. Alternatively, the two polarizations can be treated mathematically as a four-dimensional real vector, where two of the dimensions correspond to the in-phase and quadrature components of one polarization, and the other two components correspond to the in-phase and quadrature components of the other polarization.

This example demonstrates the embodiment where the two polarizations at the transmitter are each modulated independently. Let $\{a_k\}$ and $\{b_k\}$ respectively represent the symbol sequences transmitted on the horizontal and vertical polarizations of the optical signal, where the symbols are in general complex. For this example, it is assumed that $a_k$ and $b_k$ are independent and identically distributed complex data symbols with $E\{a_k a_m^*\} = E\{b_k b_m^*\} = \delta_{m-k}$ where $\delta_k$ is the discrete time impulse function and $E\{.\}$ denotes expected value. Let $X(\omega)$ be the Fourier transform of the channel input $$\sum_k \begin{bmatrix} a_k \\ b_k \end{bmatrix} \delta(t - kT),$$

where $\delta(t)$ is the continuous time impulse function (or delta function), and T is the symbol period (also called one baud). Let $S(\omega)$ be the Fourier transform of the transmit pulse, s(t). In the presence of CD and PMD, the channel output can be written as $H(\omega)X(\omega)$, with the channel transfer matrix expressed as $$H(\omega) = e^{-j\beta(\omega)L} J(\omega) S(\omega), \tag{1}$$

where $\omega$ is the angular frequency, L is the fiber length of the optical channel 130, $\beta(\omega)$ is the CD parameter, $$S(\omega) = \begin{bmatrix} S(\omega) & 0 \\ 0 & S(\omega) \end{bmatrix}, \tag{2}$$

and $J(\omega)$ is the Jones matrix. The components of $J(\omega)$ are defined by $$J(\omega) = \begin{bmatrix} U(\omega) & V(\omega) \\ -V^*(\omega) & U^*(\omega) \end{bmatrix}, \tag{3}$$

where * denotes complex conjugate. Matrix $J(\omega)$ is special unitary (i.e., $J(\omega)^H J(\omega) = I$, $\det(J(\omega)) = 1$, where I is the 2×2 identity matrix and H denotes conjugate transpose) and models the effects of the PMD. For example, the Jones matrix for first-order PMD reduces to $$J(\omega) = R(\theta_0 \phi_0) \begin{bmatrix} e^{j\omega\frac{\tau}{2}+j\frac{\psi_0}{2}} & 0 \\ 0 & e^{-j\omega\frac{\tau}{2}-j\frac{\psi_0}{2}} \end{bmatrix} \tag{4}$$

where $\tau$ is the differential group delay (DGD), $\psi_0$ is the polarization phase, and $R(.,.)$ is the rotation matrix given by $$R(\theta, \phi) = \begin{bmatrix} e^{j\frac{\phi}{2}} & 0 \\ 0 & e^{-j\frac{\phi}{2}} \end{bmatrix} \begin{bmatrix} \cos(\theta) & \sin(\theta) \\ -\sin(\theta) & \cos(\theta) \end{bmatrix} \tag{5a}$$

where $\theta$ is the polarization angle and $\varphi$ is a random phase angle. Note that first order DGD may be more generally expressed as:

$$R(\theta_0 \phi_0) \begin{bmatrix} e^{j\omega\frac{\tau}{2}+j\frac{\psi_0}{2}} & 0 \\ 0 & e^{-j\omega\frac{\tau}{2}-j\frac{\psi_0}{2}} \end{bmatrix} R^{-1}(\theta_1 \phi_1) \tag{5b}$$

but the last rotation matrix does not affect the strength of the timing tone, so the simpler form given in (4) is used herein.

Assuming that CD is completely compensated in the receiver Rx DSP 166 of the receiver 160 or prior to the signal reaching the receiver Rx DSP 166, (i.e., $H(\omega) = J(\omega) S(\omega)$), the noiseless signal entering the timing recovery block 179 can be expressed as:

$$r(t) = \begin{bmatrix} r_x(t) \\ r_y(t) \end{bmatrix} = \begin{bmatrix} \sum_{k=-\infty}^{\infty} h_{11}(t - kT)a_k + h_{12}(t - kT)b_k \\ \sum_{k=-\infty}^{\infty} h_{21}(t - kT)a_k + h_{22}(t - kT)b_k \end{bmatrix}, \tag{6}$$

where 1/T is the symbol rate, while $$h_{11}(t) = \mathcal{F}^{-1}\{U(\omega)S(\omega)\}, \; h_{12}(t) = \mathcal{F}^{-1}\{V(\omega)S(\omega)\}, \tag{7}$$

$$h_{21}(t) = \mathcal{F}^{-1}\{-V^*(\omega)S(\omega)\}, \; h_{22}(t) = \mathcal{F}^{-1}\{U^*(\omega)S(\omega)\},$$

where $\mathcal{F}^{-1}\{.\}$ denotes the inverse Fourier transform.

In the nonlinear spectral line method for timing recovery, the timing recovery block 179 processes the received signal by a memoryless nonlinearity in order to generate a timing tone with frequency 1/T. A magnitude squared nonlinearity is used as the memoryless nonlinearity applied to the received signal. Then, the mean value of the magnitude squared of the received signal is periodic with period T and can be expressed through a Fourier series as $$E\{|r_x(t)|^2\} = \frac{1}{\pi T} \sum_{k=0}^{\infty} \text{Re}\left\{z_{x,k} e^{j\frac{2\pi k t}{T}}\right\}, \tag{8}$$

$$E\{|r_y(t)|^2\} = \frac{1}{\pi T} \sum_{k=0}^{\infty} \text{Re}\left\{z_{y,k} e^{j\frac{2\pi k t}{T}}\right\}, \tag{9}$$

where $$z_{x,k} = \int_{-\infty}^{\infty} U(\omega)U^*\left(\omega - \frac{2\pi k}{T}\right) S(\omega)S^*\left(\omega - \frac{2\pi k}{T}\right) d\omega + \int_{-\infty}^{\infty} V(\omega)V^*\left(\omega - \frac{2\pi k}{T}\right) S(\omega)S^*\left(\omega - \frac{2\pi k}{T}\right) d\omega \tag{10}$$

$$z_{y,k} = \int_{-\infty}^{\infty} V^*(\omega)V\left(\omega - \frac{2\pi k}{T}\right) S(\omega)S^*\left(\omega - \frac{2\pi k}{T}\right) d\omega + \int_{-\infty}^{\infty} U^*(\omega)U\left(\omega - \frac{2\pi k}{T}\right) S(\omega)S^*\left(\omega - \frac{2\pi k}{T}\right) d\omega. \tag{11}$$

The timing information can be extracted either from the periodic signal derived from the received x polarization ($E\{|r_x(t)|^2\}$), or from the periodic signal derived from the received y polarization ($E\{|r_y(t)|^2\}$), or from some combination of these two periodic signals. Additional details regarding the nonlinear spectral line method for timing recovery is described in J. R. Barry, E. A. Lee, and D. G. Messerschmitt, Digital Communication. KAP, third ed. 2004.

Timing Information Using One Polarization

The following description explains the effects of PMD when one polarization is used for timing recovery and gives example conditions where the timing recovery information can disappear. From (8)-(9), it can be seen that the clock signal 181 will be different from zero in $|r_x(t)|^2$ (or $|r_y(t)|^2$) if the magnitude of the Fourier coefficient $|z_{x,1}| > 0$ (or $|z_{y,1}|>0$). On the other hand, from (10) and (11) it can be verified that the timing tone in each polarization component will be zero if $$V(\omega) = e^{j\psi} e^{\pm j\omega \frac{T}{2}} U(\omega), \quad (12)$$

where $\psi$ is an arbitrary phase. Since the Jones matrix is special unitary (so $|U(\omega)|^{2} + |V(\omega)|^2 = 1$), the following expression can be derived from (12)

$$|U(\omega)| = |V(\omega)| = \frac{1}{\sqrt{2}}. \quad (13)$$

Let $\gamma(\omega)/2$ be the phase response of $U(\omega)$. Then, from (12) and (13), the clock signal disappears when the Jones matrix representing the PMD at the input of the timing recovery block 179 can be expressed as $$J_0(\omega) = \begin{bmatrix} \frac{1}{\sqrt{2}} e^{j\frac{\gamma(\omega)}{2}} & \frac{1}{\sqrt{2}} e^{j\frac{\gamma(\omega)}{2}} \\ -\frac{1}{\sqrt{2}} e^{-j\frac{\gamma(\omega)}{2}} & \frac{1}{\sqrt{2}} e^{-j\frac{\gamma(\omega)}{2}} \end{bmatrix} \begin{bmatrix} e^{\pm j\omega\frac{T}{4}+j\frac{\psi}{2}} & 0 \\ 0 & e^{\mp j\omega\frac{T}{4}-j\frac{\psi}{2}} \end{bmatrix} \quad (14)$$

$$= R(\pi/4, \gamma(\omega)) \begin{bmatrix} e^{\pm j\omega\frac{T}{4}+j\frac{\psi}{2}} & 0 \\ 0 & e^{\mp j\omega\frac{T}{4}-j\frac{\psi}{2}} \end{bmatrix}.$$

Figure 2:
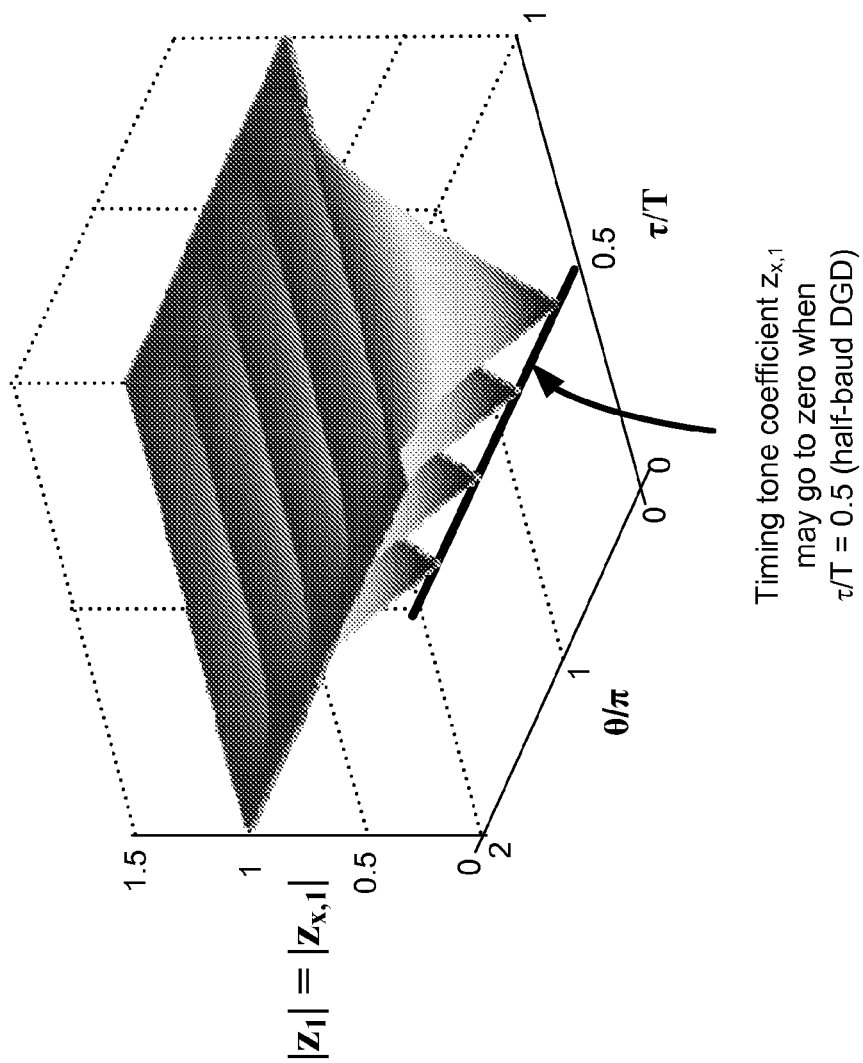
FIG. 2 is a plot illustrating an effect of half baud DGD in an uncompensated optical receiver where a single polarization is used for timing recovery.

For example, the impact of the first-order PMD defined by (4) is analyzed in FIG. 2. Here, the plot illustrates the normalized magnitude of the timing tone coefficient $z_{x,1}$ derived from (10), versus DGD ($\tau$) and the rotation angle ($\theta$) assuming an ideal lowpass pulse s(t) with bandwidth excess <100%. In particular, for $\tau=T/2$, and $\theta_0=\pi/4$, the following expression can be derived from (4):

$$J(\omega) = R(\pi/4, \phi_0) \begin{bmatrix} e^{j\omega\frac{T}{4}+j\frac{\psi_0}{2}} & 0 \\ 0 & e^{-j\omega\frac{T}{4}-j\frac{\psi_0}{2}} \end{bmatrix}. \quad (15)$$

The matrix in (15) can be written as (14) (with $\gamma(\omega)=\varphi_0$ and $\psi=\psi_0$). It can be inferred from the equations above that the clock signal may disappear with half-baud DGD, as illustrated in FIG. 2.

Timing Information Using Two Polarizations

The effects of PMD are now described when both polarizations are used for timing recovery and conditions where the timing recovery information can disappear are presented. In particular, the sum of the squared signals of both polarizations may be used for timing recovery (i.e., $|r_x(t)|^2 + |r_y(t)|^2$). Then, the total timing tone coefficient $z_{x+y,1}$ can be expressed as:

$$z_{x+y,1} = \quad (16)$$
$$z_{x,1} + z_{y,1} = \int_{-\infty}^{\infty} 2\Re\left\{U(\omega)U^*\left(\omega - \frac{2\pi}{T}\right)\right\} S(\omega)S^*\left(\omega - \frac{2\pi}{T}\right) d\omega + \int_{-\infty}^{\infty} 2\Re\left\{V(\omega)V^*\left(\omega - \frac{2\pi}{T}\right)\right\} S(\omega)S^*\left(\omega - \frac{2\pi}{T}\right) d\omega,$$

where $\Re\{.\}$ denotes the real part of the expression.

Figure 3:
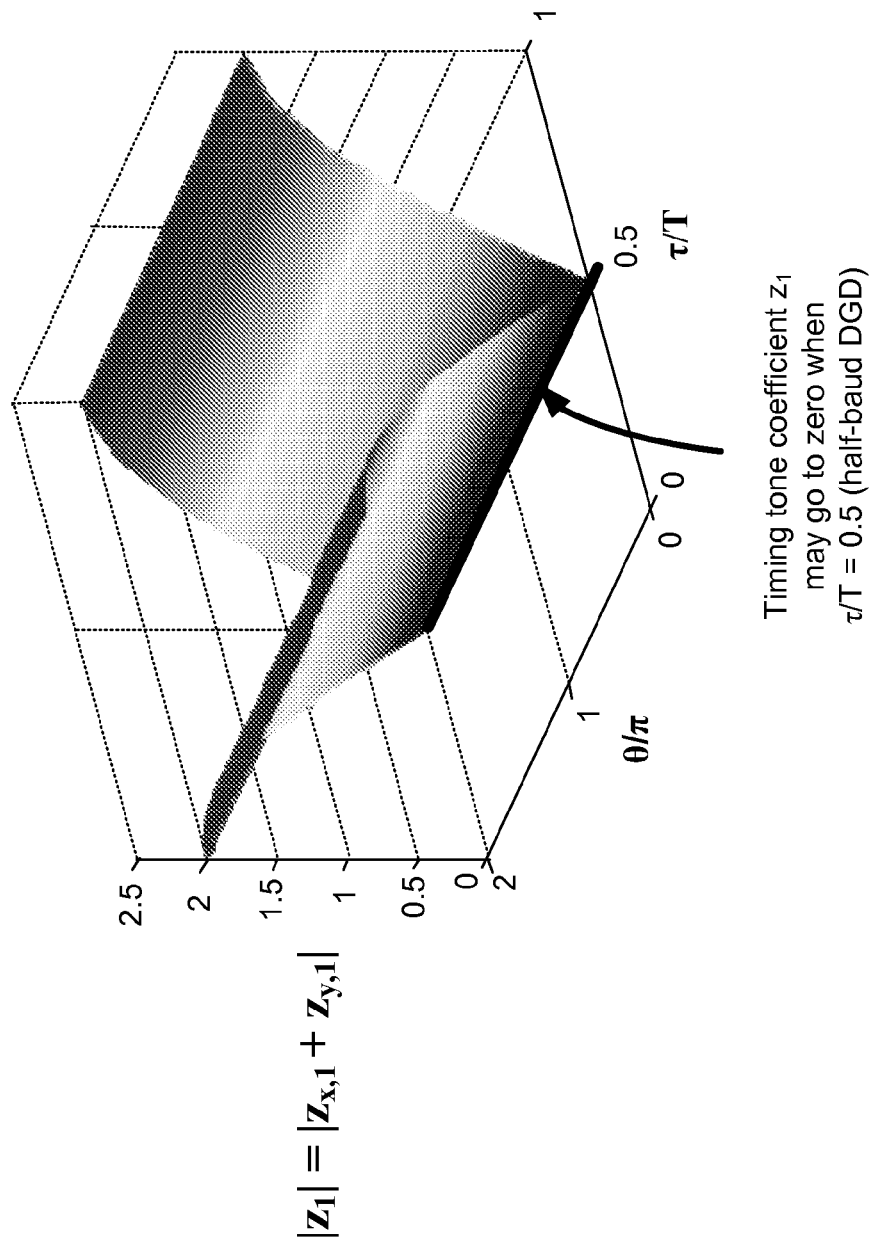
FIG. 3 is a plot illustrating an effect of half baud DGD in an uncompensated optical receiver where two polarizations are used for timing recovery.

For example, from (16) it is observed that the clock signal will be zero if $$U(\omega) = |U(\omega)|e^{\pm j\omega\frac{T}{4}} e^{j\frac{\psi_U}{2}} \text{ and} \quad (17)$$
$$V(\omega) = |V(\omega)|e^{\pm j\omega\frac{T}{4}} e^{j\frac{\psi_V}{2}},$$

where $\psi_U$ and $\psi_V$ are arbitrary angles. As can be seen, the first-order PMD defined by (4) with $\tau=T/2$ satisfies condition (17) for any combination of $\theta_0$, $\varphi_0$ and $\psi_0$. Therefore, the clock signal contained in $|r_x(t)|^2 + |r_y(t)|^2$ is lost in the presence of half-baud DGD. This is illustrated in FIG. 3, which is a plot of the normalized timing tone magnitude in $|r_x(t)|^2 + |r_y(t)|^2$ versus DGD ($\tau$) and the rotation angle ($\theta$).

Timing Information in Cascaded DGD with Two Segments

Figure 4:
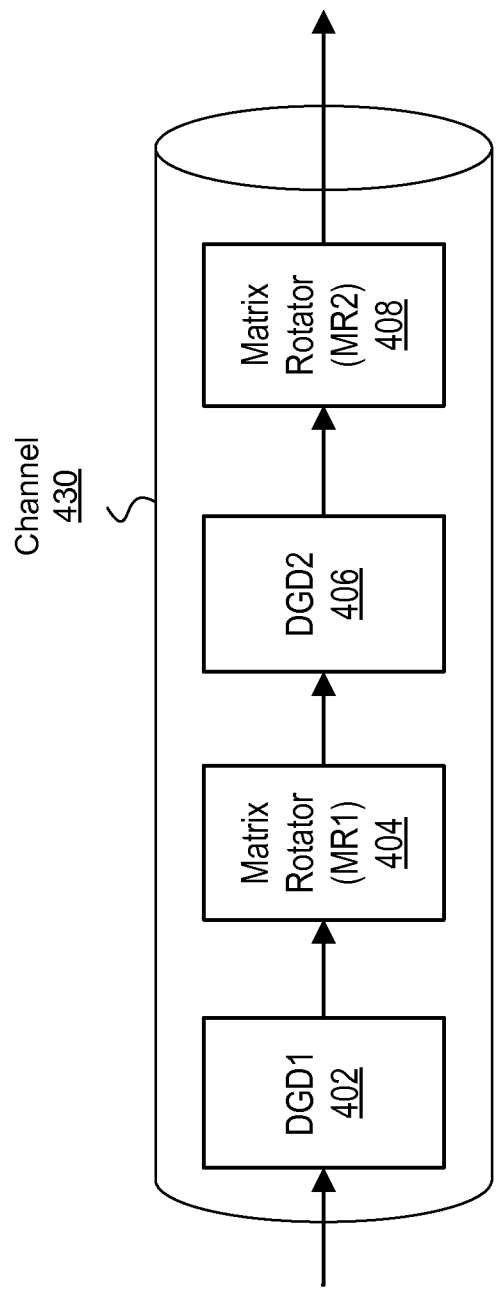
FIG. 4 is a diagram modeling PMD effects in an optical channel.

Under certain conditions, the timing tone generated using the nonlinear spectral line method may generate a timing tone with a frequency offset which causes a loss of synchronization. An example channel 430 (which may be used as channel 130) having these conditions is illustrated in FIG. 4. Here, the channel is modeled as a first DGD block 402, a first matrix rotation block 404, a second DGD block 406, and a second matrix rotation block 408, which each represent distortions in the channel. The signal sent over the channel 430 comprises an optical signal having two polarizations (e.g., a horizontal and vertical polarization, or more generally, an "X" and "Y" polarization) of the optical signal received by the optical front end 150. These two polarizations can be treated mathematically as a two-dimensional complex vector, where each component corresponds to one of the polarizations of the received optical signal and is expressed as a complex representation of in-phase and quadrature signals. The first DGD block 402 and second DGD block 406 each apply a transform $$\begin{bmatrix} e^{j\omega T/4} & 0 \\ 0 & e^{-j\omega T/4} \end{bmatrix}$$

to the incoming signal. The first matrix rotation block 404 and the second matrix rotation block 408 each apply a transform $$MR = \begin{bmatrix} \cos(\theta) & \sin(\theta) \\ -\sin(\theta) & \cos(\theta) \end{bmatrix}$$

where in this example, $\theta=\omega_R t$ for the first matrix rotation block 404 and, $\theta=\pi/4$ for the second matrix rotation block 408.

The timing tone coefficients for each polarization ($z_{x,1}$ and $z_{y,1}$) are given by the diagonal elements of the 2×2 matrix $$M_t = \begin{bmatrix} z_{x,1} & z_{xy} \\ z_{yx} & z_{y,1} \end{bmatrix} = \int_{-\infty}^{\infty} S(\omega)S^H\left\{\omega - \frac{2\pi}{T}\right\} J(\omega)J^H\left\{\omega - \frac{2\pi}{T}\right\} d\omega \quad (18)$$

where $S(\omega)$ is the transfer function of the transmit and receive filters and $J(\omega)$ is the Jones matrix. The components of $J(\omega)$ are defined by $$J(\omega) = \begin{bmatrix} U(\omega) & V(\omega) \\ -V^*(\omega) & U^*(\omega) \end{bmatrix} \quad (19)$$

where * denotes complex conjugate. Matrix $J(\omega)$ is special unitary (i.e., $J(\omega)^H J(\omega)=I$, $\det(J(\omega))=1$, where I is the 2×2 identity matrix and H denotes conjugate transpose) and models the effects of the PMD.

Since $\omega_R \ll 2\pi/T$, the PMD matrix of the channel 430 described previously is given by:

$$J(\omega) \approx \frac{1}{\sqrt{2}} \begin{bmatrix} \cos(\omega_R t)e^{j\frac{\omega T}{2}} - \sin(\omega_R t) & \cos(\omega_R t)e^{-j\frac{\omega T}{2}} + \sin(\omega_R t) \\ -\cos(\omega_R t)e^{j\frac{\omega T}{2}} - \sin(\omega_R t) & \cos(\omega_R t)e^{-j\frac{\omega T}{2}} - \sin(\omega_R t) \end{bmatrix} \quad (20)$$

Assuming that the bandwidth excess is small-moderate (i.e., $S(\omega)S^H(\omega-2\pi/T)$ is concentrated around $\omega=\pi/T$), then the timing matrix $M_t$ can be approximated as:

$$M_t \approx K_s J\left(\frac{\pi}{T}\right) J^H\left(-\frac{\pi}{T}\right) \quad (21)$$

where $K_s$ is a given complex constant and $$J\left(\frac{\pi}{T}\right) = \frac{1}{\sqrt{2}} \begin{bmatrix} je^{j\omega_R t} & -je^{j\omega_R t} \\ -je^{-j\omega_R t} & -je^{-j\omega_R t} \end{bmatrix} \quad (22)$$

$$J^H\left(-\frac{\pi}{T}\right) = \frac{1}{\sqrt{2}} \begin{bmatrix} je^{j\omega_R t} & -je^{j\omega_R t} \\ -je^{-j\omega_R t} & -je^{-j\omega_R t} \end{bmatrix}$$

Based on the above equations, $$M_t \approx -K_s \begin{bmatrix} e^{j2\omega_R t} & 0 \\ 0 & e^{-j2\omega_R t} \end{bmatrix} \quad (23)$$

Note that the timing tone energy in a given polarization is maximized. The resulting clock tone in a given polarization results in $$c_x(t) = 2\Re\{z_{x,1}e^{j2\pi t/T}\} \quad (24)$$
$$= -2\Re\{K_s e^{j2\omega_R t} e^{j2\pi t/T}\}$$
$$= -2\Re\{K_s e^{j2\pi(2/T_R + 1/T)t}\} \quad \omega_R = 2\pi f_R = 2\pi/T_R$$

From the above, it can be observed that the frequency of the clock signal provided by the spectral line timing recovery algorithm is shifted by $2/T_R$. In other words, the timing tone is modulated by the time variations of the DGD which is affected by the frequency of the rotation matrices between the DGD segments. Therefore, under these conditions, a proper clock signal with frequency $1/T$ will not be properly detected using a conventional spectral line method technique.

The channel 430 having two DGD elements with a rotating element between them is only one example of a channel having dynamic PMD. A more general channel with dynamic PMD is modeled as an arbitrarily large number of DGD elements, with randomly varying rotation angles between the DGD elements. These channels can cause timing recovery methods based on a traditional nonlinear spectral line method to fail by causing a frequency offset (as described above) or by causing randomly varying phase between the received symbol clock and the sampling clock. The randomly varying phase can accumulate to cause an offset of multiple symbol periods between the received signal and the sampling clock, resulting in eventual failure of the receiver once the receiver can no longer compensate for the shift in timing. This situation is compounded by the presence of residual chromatic dispersion that reaches the timing recovery circuit, which can cause the amplitude of the timing tone to fade. The disclosed embodiments solve for these impairments and perform robustly in the presence of general dynamic PMD and in the presence of residual chromatic dispersion.

Timing Recovery Architecture and Method

Figure 5:
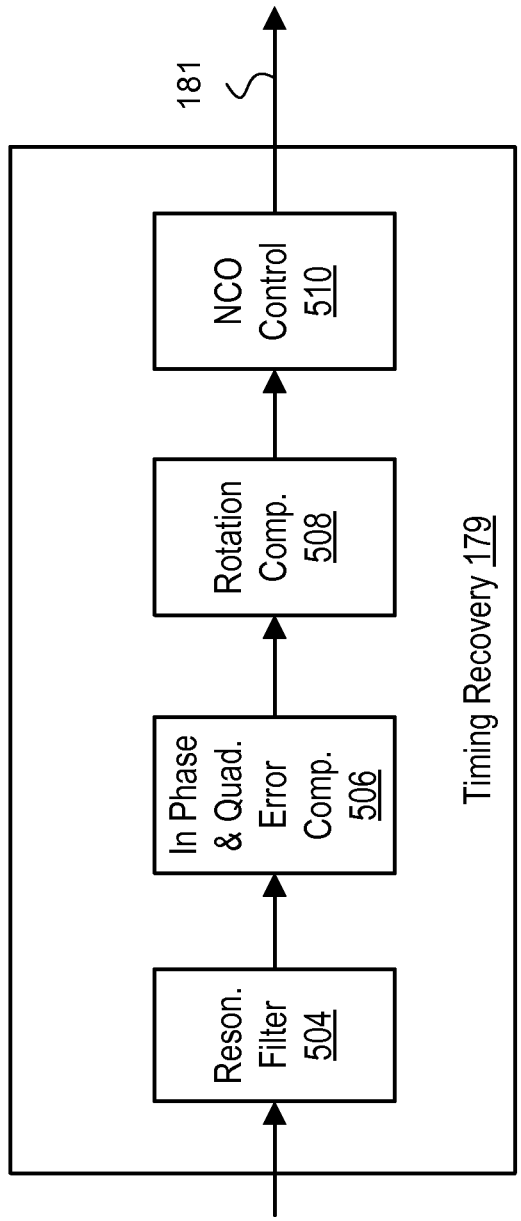
FIG. 5 is a block diagram illustrating an embodiment of a timing recovery system.

FIG. 5 illustrates an example embodiment of a timing recovery system that generates a timing recovery signal without the problems of the spectral line method discussed above. In one embodiment, the timing recovery block 179 comprises a resonator filter 504, an in-phase and quadrature error computation block 506, a rotation computation block 508, and a numerically controlled oscillator (NCO) control block 510.

The resonator filter 504 receives oversampled input samples of the two polarizations, which may be received directly from an oversampling analog-to-digital converter (ADC) or from an interpolator filter between the ADC and the timing recovery block 179. The resonator filter 504 filters the input signal by applying, for example, a band pass filter having a center frequency of approximately 1/(2T). This center frequency is used because the timing information in a spectral line timing recovery scheme is generally within the vicinity of this frequency band. The phase and quadrature error computation block 506 interpolates the filtered signal (e.g., from two samples per baud to four samples per baud per polarization) from the resonator filter 504 and determines in-phase and quadrature error signals from the interpolated signal. The rotation computation block 508 generates a timing matrix representing detected timing tones and estimates a rotation error based on the timing matrix. The rotation error signal controls the NCO control block 510 which adjusts the sampling phase or frequency, or both, of the sampling clock 181 based on the rotation error. In alternative embodiments, the NCO control block 510 may instead control sampling phase of an interpolator filter between the ADC and the timing recovery block, rather than controlling sampling phase and frequency of the sampling clock 181 directly.

Figure 6:
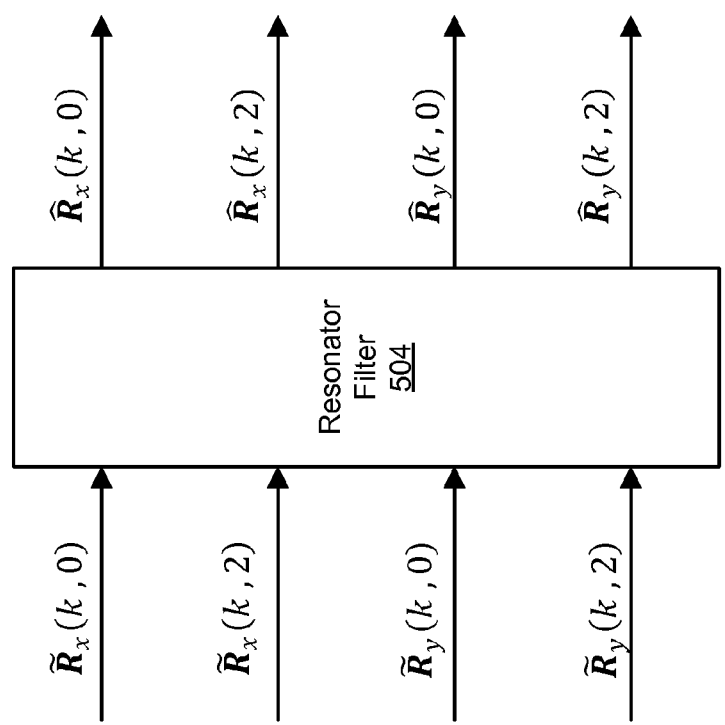
FIG. 6 is a block diagram illustrating an embodiment of a resonator filter for a timing recovery system.

FIG. 6 illustrates the input and output signals from the resonator filter 504 in more detail. The resonator filter 504 receives an oversampled input signal $\tilde{R}$ which may be generated by, for example, an interpolator filter or directly from an analog-to-digital converter in the Rx AFE 168. For example, in one embodiment $\tilde{R}$ has a sampling rate of 2/T per polarization where T is the period of the timing tone. In this example, $\tilde{R}$ comprises four vector components:

$$\tilde{R}_x(k,0) = [r_x(kN_{TR},0), r_x(kN_{TR}+1,0), \ldots r_x(kN_{TR}+N_{TR}-1,0)]$$

$$\tilde{R}_x(k,2) = [r_x(kN_{TR},2), r_x(kN_{TR}+1,2), \ldots r_x(kN_{TR}+N_{TR}-1,2)]$$

$$\tilde{R}_y(k,0)=[r_y(kN_{TR},0),r_y(kN_{TR}+1,0),\ldots$$
$$r_y(kN_{TR}+N_{TR}-1,0)]$$

$$\tilde{R}_y(k,2)=[r_y(kN_{TR},2),r_y(kN_{TR}+1,2),\ldots r_y(kN_{TR}+N_{TR}-1,2)] \quad (25)$$

where $\tilde{R}_x(k, 0)$ represents an $N_{TR}$ dimensional vector with even samples of a first polarization "X"; $\tilde{R}_x(k, 2)$ represents an $N_{TR}$ dimensional vector with odd samples of the first polarization "X"; $\tilde{R}_y(k, 0)$ represents an $N_{TR}$ dimensional vector with odd samples of a second polarization "Y"; and $\tilde{R}_y(k, 2)$ represents and $N_{TR}$ dimensional vector with even samples of the second polarization "Y," and k is an index number associated with each set of $4N_{TR}$ samples. In one embodiment, $N_{TR}=64$, although different dimensionalities may be used in alternative embodiments. The polarizations "X" and "Y" are used generically to refer to signals derived from two different polarizations of an optical signal and in one embodiment correspond to horizontal and vertical polarizations respectively, or vice versa.

Each element of the N dimensional vectors are in the form $r_a(n, l)$ a$\in$(x, y) where n represents the number of the symbol and l$\in$[0, 1, 2, 3] represents the sampling phase with four sample phases per symbol per polarization at a sampling rate of 4/T, two of which (0 and 2) are used at a sampling rate of 2/T. For example, the two samples associated with the first polarization "X" in the symbol n are represented by $r_x(n, 0)$ $r_x(n, 2)$ when the signal derived from polarization X is sampled at a sampling rate of 2/T. The two samples associated with the second polarization "Y" in the symbol n are represented by $r_y(n, 0)$ $r_y(n, 2)$ when the signal derived from polarization Y is sampled at a sampling rate of 2/T.

The resonator filter 504 applies a unit pulse response $h_{rf}(n)$ to the incoming signal $\tilde{R}$ where $$h_{rf}(n) = \frac{2}{N_{rf}}\sin\left(n\frac{\pi}{2}\right) \times rect_{N_{rf}}(n) \quad (28)$$

$$rect_{N_{rf}}(n) = \sum_{i=0}^{N_{rf}-1}\delta_{n-i}$$

where $N_{rf}$ represents the number of taps in the resonator filter 504. In this notation, the unit pulse response $h_{rf}(n)$ is based on a sampling rate of 2/T. For example, if the input signal is sampled at 2/T, then in one embodiment, $$N_{rf} = 16 \to \frac{2}{N_{rf}} = 2^{-3} \quad (29)$$

or $$N_{rf} = 32 \to \frac{2}{N_{rf}} = 2^{-4}$$

The unit pulse response $h_{rf}(n)$ can also be written as:

$$h_{rf}(n) = \frac{2}{N_{rf}}[0, 1, 0, -1, 0, 1, \ldots] \quad (30)$$

By filtering the signal derived from polarization a sampled at a rate of 2/T, where a$\in$(x, y), with the unit pulse response $h_{rf}(n)$ above, the resonator filter 504 generates a signal $\hat{R}$ comprising four vector components: $\hat{R}_x(k, 0)$, $\hat{R}_x(k, 2)$, $\hat{R}_y(k, 0)$, $\hat{R}_y(k, 2)$ having the general form:

$$\hat{R}_a(k, l) = [\bar{r}_a(kN_{TR}, l), \ldots \bar{r}_a(kN_{TR} + N_{TR} - 1, l)] \quad (31)$$

$$a \in (x, y) \; l \in (0, 2)$$

where $$\bar{r}_a(kN_{TR} + m, l) = \frac{2}{N_{rf}}\sum_{i=0}^{N_{rf}/2-1}(-1)^i r_a(kN_{TR} + m - i, l) \quad (32)$$

$$m \in [0, 1, \ldots, N_{TR}-1]$$
$$a \in (x, y) \; l \in (0, 2)$$

An effect of the resonator filter 504 is to band pass filter the signal around the frequency 1/(2T) where the timing information is contained. Although chromatic dispersion may be compensated for in the Rx DSP 166 or by other means prior to the timing recovery block 179, residual chromatic dispersion (that is, chromatic dispersion that has not been compensated for prior to the timing recovery circuit 179) has the effect of varying the timing tone level particularly in the presence of a high roll-off factor of the transmit pulse. The resonator filter 504 limits the bandwidth excess and reduces high fluctuations of the timing tone level caused by residual chromatic dispersion, and thereby reduces the dependence of the timing tone level on the chromatic dispersion.

Figure 7:
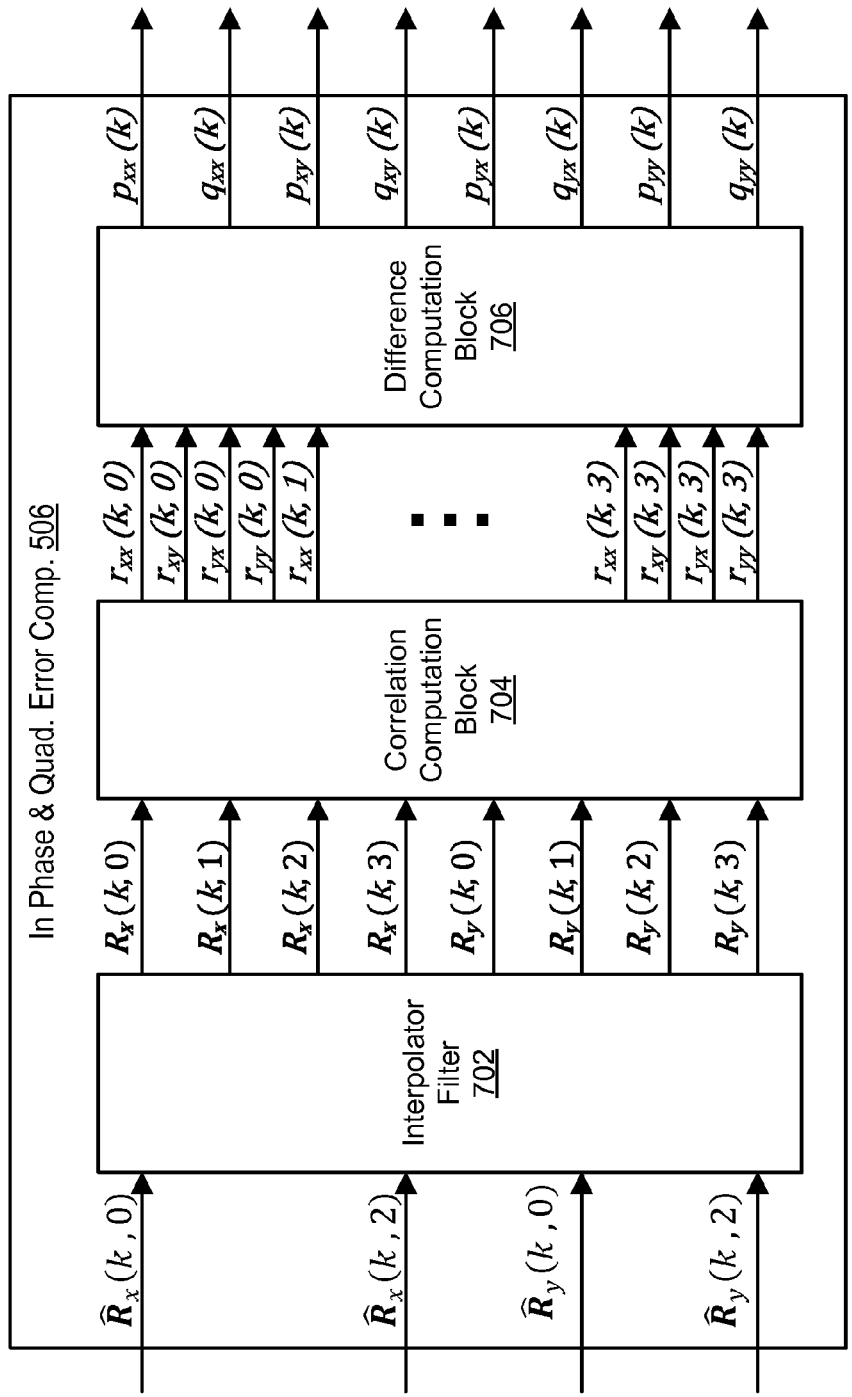
FIG. 7 is a block diagram illustrating an embodiment of an in-phase and quadrature error computation block filter for a timing recovery system.

FIG. 7 is block diagram illustrating an example embodiment of the in-phase and quadrature error computation block 506. In the illustrated embodiment, the block 506 comprises an interpolator filter 702, a correlation computation block 704, and a difference computation block 706.

The interpolator filter 702 interpolates the signal $\hat{R}$ which has two samples per polarization per symbol, to generate an interpolated signal R having four samples per polarization per symbol. Since the frequency of the timing tone is 1/T, the sampling rate of the input signal should be higher than 2/T to recover the timing tone. The interpolator filter 702 increases the sampling rate (e.g., to 4/T per polarization) in order to have a sampling rate high enough to accurately estimate the timing tone. The signal R generated by the interpolator filter 702 has eight components (four for each polarization) having form:

$$R_a(k,l)=[r_a(kN_{TR},l),\ldots r_a(kN_{TR}+N_{TR}-1,l)]$$

$$a\in(x,y) \; l\in(0,1,2,3) \quad (33)$$

where:

$$r_a(kN_{TR}+m,0)=\bar{r}_a(kN_{TR}+m-d_{if},0)$$

$$r_a(kN_{TR}+m,1)= \sum_{i=0}^{N_{if}-1}c_0(i)\bar{r}_a(kN_{TR}+m-1-i,2)+\sum_{i=0}^{N_{if}-1}c_1(i)\bar{r}_a(kN_{TR}+m-i,0)$$

$$r_a(kN_{TR}+m,2)=\bar{r}_a(kN_{TR}+m-d_{if},2)$$

$$r_a(kN_{TR}+m,3)=\sum_{i=0}^{N_{if}-1}c_0(i)\bar{r}_a(kN_{TR}+m-i,0)+\sum_{i=0}^{N_{if}-1}c_1(i)\bar{r}_a(kN_{TR}+m-i,2) \quad (34)$$

for a$\in$(x, y) and m$\in$[0, 1, . . . , $N_{TR}$-1] and where $2N_{if}$ is the tap number of the interpolation filter 702 and $d_{if}$ is a delay where $d_{if} < N_{if}$.

Information of a given transmit polarization may be contained in both received polarizations due to fiber channel impairments such as PMD. Thus, in order to recover the timing tones, a correlation of the received signals is performed by the correlation computation block 704. The correlation computation block 704 receives the interpolated signal R (e.g., having 8 $N_{TR}$ dimensional vector components) and generates correlated signals r having 16 components which are each a scalar complex value. For example, in one embodiment, the correlated signal includes components $r_{xx}(k, 0)$, $r_{xy}(k, 0)$, $r_{yx}(k, 0)$, $r_{yy}(k, 0)$, $r_{xx}(k, 1)$, ... $r_{xx}(k, 3)$, $r_{xy}(k, 3)$, $r_{yx}(k, 3)$, $r_{yy}(k, 3)$ where each component is given by:

$$r_{ab}(k,i) = R_a(k,i) \times R_b^{H(k,i)}$$

$$a, b \in (x, y) \tag{35}$$

where $(.)^H$ indicates a transpose and conjugate. All of the timing information is contained in the correlated signals r at the output of the correlation computation block 704.

To extract the amplitude and phases of the four timing tones of frequency 1/T, the difference computation block 706 computes in-phase error p and quadrature error q, which are each defined as the difference of two samples separated by T/2. In one embodiment, the difference computation block 706 receives the correlated signal and generates a signal representative of the in-phase and quadrature error in the block of samples. In one embodiment, the in-phase and quadrature error signals comprise four in-phase error components: $p_{xx}(k)$, $p_{xy}(k)$, $p_{yx}(k)$, $p_{yy}(k)$ and four quadrature error components: $q_{xx}(k)$, $q_{xy}(k)$, $q_{yx}(k)$, $q_{yy}(k)$.

In one embodiment, the in-phase error components are given by:

$$p_{ab}(k) = r_{ab}(k,0) - r_{ab}(k,2) \quad a, b \in (x, y) \tag{36}$$

and the quadrature error components are given by:

$$q_{ab}(k) = r_{ab}(k,1) - r_{ab}(k,3) \quad a, b \in (x, y) \tag{37}$$

Figure 8A:
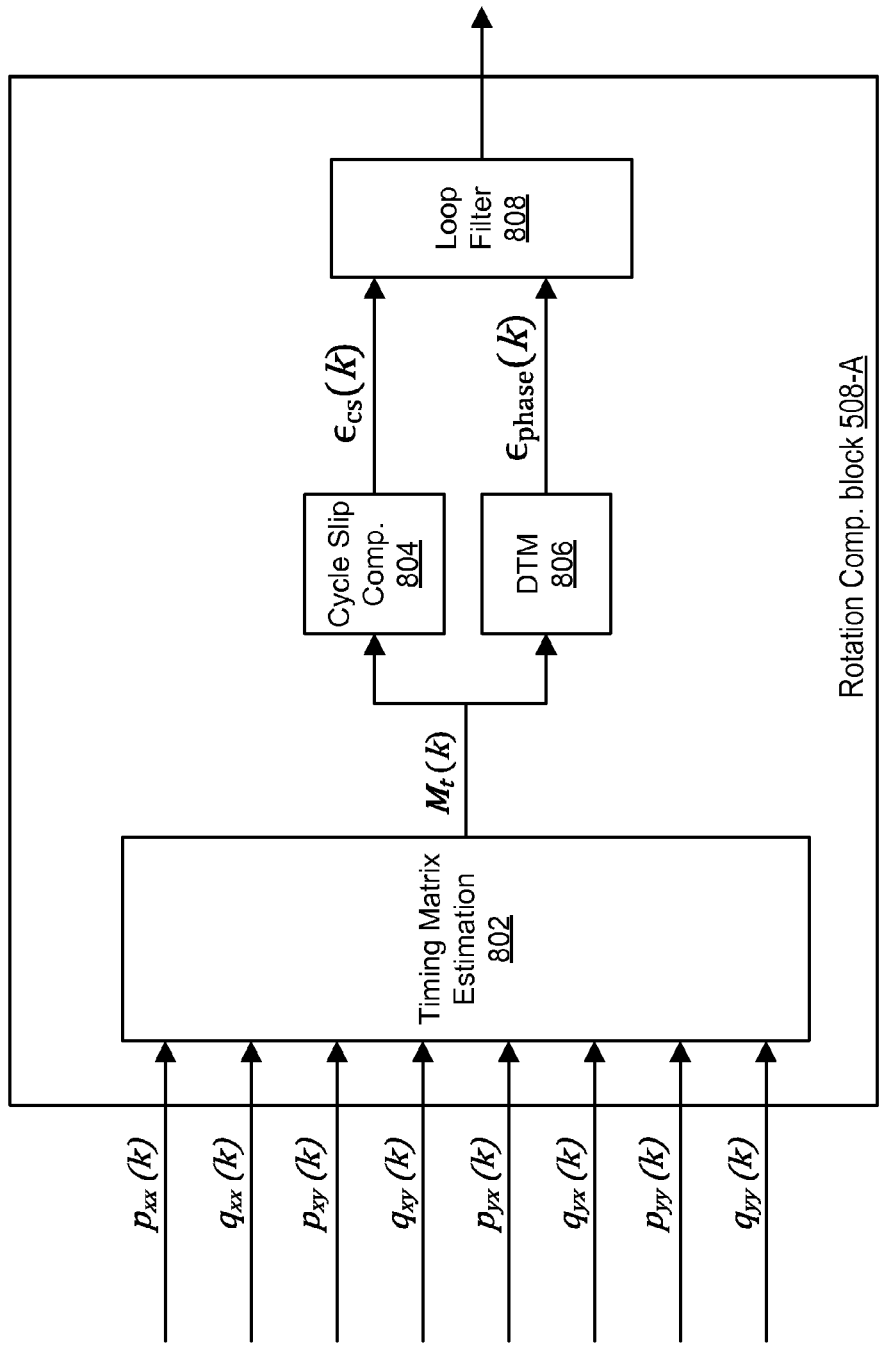
FIG. 8A is a block diagram illustrating an embodiment of a phase error computation block for a timing recovery system that applies a determinant method.
Figure 8B:
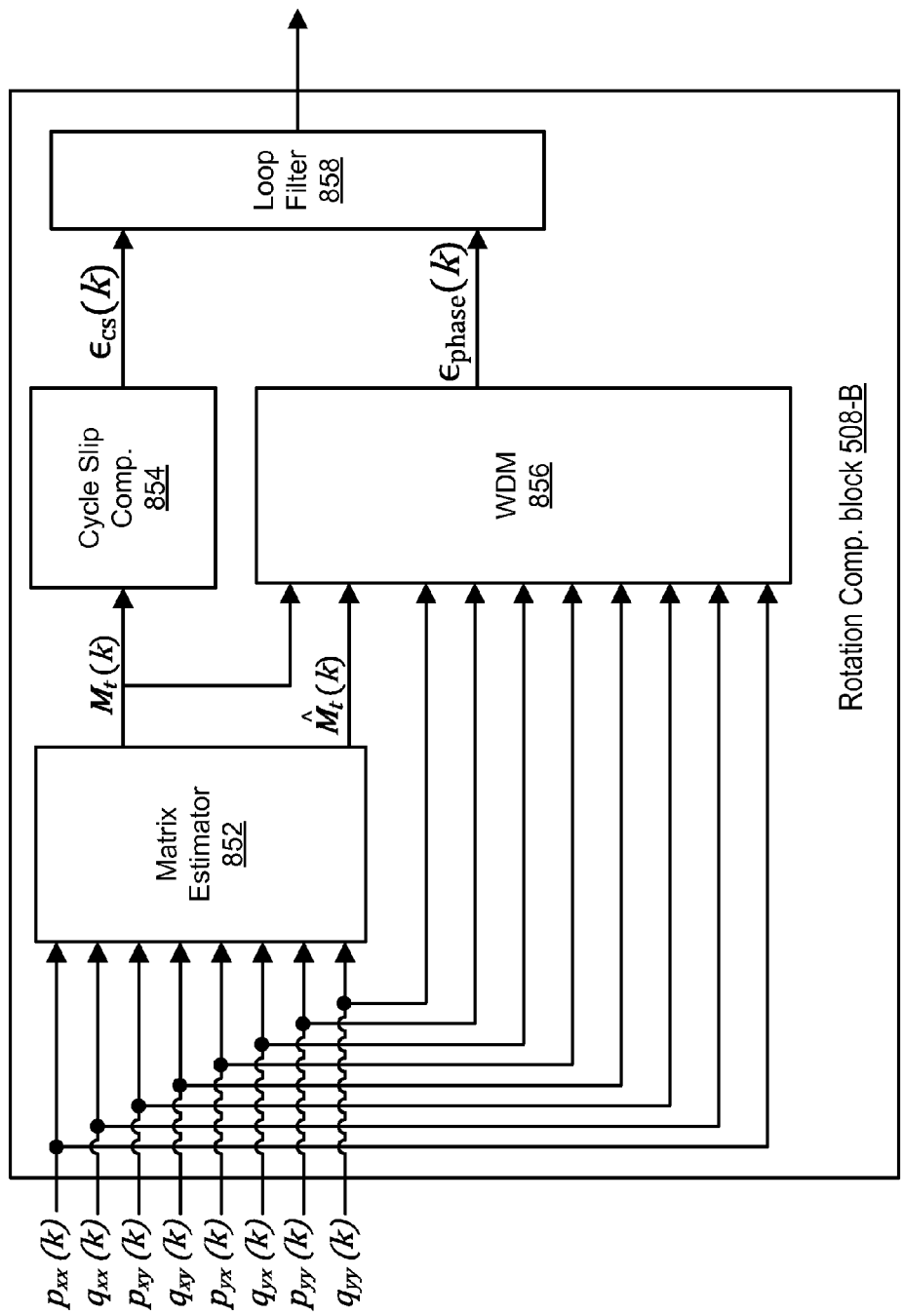
FIG. 8B is a block diagram illustrating an embodiment of a phase error computation block for a timing recovery system that applies a modified wave difference method.

FIGS. 8A and 8B illustrate alternative embodiments of the rotation computation block 508, where the alternative embodiments are designated 508-A and 508-B in FIGS. 8A and 8B respectively. In the embodiment of FIG. 8A, the rotation computation block 508-A estimates the phase error using a determinant method. In the embodiment of FIG. 8B, the rotation computation block 508-B estimates the phase error using a modified wave difference method. Referring first to FIG. 8A, in one embodiment, the rotation computation block 508-A comprises a matrix estimator 802, a cycle slip computation block 804, a DTM block 806, and a loop filter 808. The timing matrix estimation block 802 estimates a timing matrix from the in-phase and quadrature error signals where the timing tone coefficient for each element of the matrix is the complex number with real and imaginary parts given by p and q respectively. In one embodiment, the timing matrix has the following form:

$$M_t(k) = \begin{bmatrix} M_t^{(1,1)}(k) & M_t^{(1,2)}(k) \\ M_t^{(2,1)}(k) & M_t^{(2,2)}(k) \end{bmatrix} \tag{38}$$

The timing matrix $M_t(k)$ is calculated as follows:

$$M_t^{(1,1)}(k) = \beta M_t^{(1,1)}(k-1) + (1-\beta)[p_{xx}(k) - jq_{xx}(k)]$$

$$M_t^{(1,2)}(k) = \beta M_t^{(1,2)}(k-1) + (1-\beta)[p_{xy}(k) - jq_{xy}(k)]$$

$$M_t^{(2,1)}(k) = \beta M_t^{(2,1)}(k-1) + (1-\beta)[p_{yx}(k) - jq_{yx}(k)]$$

$$M_t^{(2,2)}(k) = \beta M_t^{(2,2)}(k-1) + (1-\beta)[p_{yy}(k) - jq_{yy}(k)] \tag{39}$$

where $\beta$ is a constant and $M_t(k)$ can assume an initial value of all zeros. For example, in one embodiment, $\beta = 1 - 2^{-m}$ (e.g., m=6), although other values of $\beta$ may be used in alternative embodiments.

The cycle slip computation block 804 receives the timing matrix $M_t(k)$, and generates a cycle slip number signal $\epsilon_{cs}(k)$. The cycle slip number signal $\epsilon_{cs}(k)$ represents a number of cycle slips of the sampling phase relative to the received signal. A cycle slip occurs when the sampling phase shifts a symbol period T. This effect generally occurs during the start-up period and its frequency depends on clock error between the transmit and receive signals.

To determine the number of cycle slips, the cycle slip computation block 804 calculates a determinant of the timing matrix $M_t(k)$ as follows:

$$\rho(k) = M_t^{(1,1)}(k) * M_t^{(2,2)}(k) - M_t^{(1,2)}(k) * M_t^{(2,1)}(k) \tag{40}$$

In-phase and quadrature phase error signals and then computed as:

$$\tilde{p}(k) = \text{sign}[\text{real}\{\rho(k)\}] \tag{41}$$
$$\tilde{q}(k) = \text{sign}[\text{imag}\{\rho(k)\}]$$

where $$\text{sign}[x] = \begin{cases} 1 & x \geq 0 \\ -1 & x < 0 \end{cases} \tag{42}$$

real[x] is the real part of complex x and imag[x] is the imaginary part of complex x. The accumulated number of cycle slips is determined as:

$$\epsilon_{cs}(k) = \Sigma_{i=0}^k cs(i) \tag{43}$$

where:

$cs(k) = -1$ when $(\tilde{p}(k-1), \tilde{q}(k-1)) = (1,1)$ and $(\tilde{p}(k), \tilde{q}(k)) = (1,-1)$ $cs(k) = -1$ when $(\tilde{p}(k-1), \tilde{q}(k-1)) = (-1,-1)$ and $(\tilde{p}(k), \tilde{q}(k)) = (-1,1)$ $cs(k) = +1$ when $(\tilde{p}(k-1), \tilde{q}(k-1)) = (1,-1)$ and $(\tilde{p}(k), \tilde{q}(k)) = (1,1)$ $cs(k) = +1$ when $(\tilde{p}(k-1), \tilde{q}(k-1)) = (-1,1)$ and $(\tilde{p}(k), \tilde{q}(k)) = (-1,-1)$ $cs(k) = 0$ otherwise. $\tag{44}$ The DTM block 806 computes a phase error signal $\epsilon_{phase}(k)$ representing the estimated phase error of a local clock relative to the received signal. In the embodiment of FIG. 8A, the phase error signal $\epsilon_{phase}(k)$ is calculated using a determinant method.

In the determinant method, the phase error signal is given by $$\epsilon_{phase}(k) = \epsilon_{DTM}(k) = \gamma(k) = \arg\{\rho(k)\} \tag{45}$$

In one embodiment, the argument of the determinant is determined using a lookup table. In one embodiment, the DTM block 806 and cycle slip computation block 804 are integrated such that the determinant of the timing matrix $M_t(k)$ is determined only once, and may then be used to compute both $\epsilon_{cs}(k)$ and $\epsilon_{phase}(k)$.

The loop filter 808 filters and combines the phase error signal $\epsilon_{phase}(k)$ and the cycle slip number signal $\epsilon_{cs}(k)$ to generate a control signal to the NCO 510 that controls a total accumulated phase shift in the received signal to be compensated. For example, in one embodiment, the loop filter 808 applies a proportional-integral (PI) filter to the phase error signal $\epsilon_{phase}(k)$ to generate a filtered phase error signal $\epsilon'_{phase}(k)$. For example, in one embodiment, the PI filter has an output $L(z) = K_p + K_i/1 - z^{-1}$ where $K_p$ and $K_i$ are gain constants. The loop filter 808 then combines the number of cycle slips $\epsilon_{cs}(k)$ with the filtered phase error $\epsilon'_{phase}(k)$ to detect the total rotation and provides this information as a control signal to the NCO 510. For example, in one embodiment, the loop filter 808 implements the function:

$$NCO_{control}(k)=\epsilon'_{phase}(k)-k_{cs}\epsilon_{cs}(k) \quad (46)$$

where $k_{cs}$ is a constant that represents a gain of the loop filter 808. For example, in one embodiment, $k_{cs}=2^{-3}$ although other gain constants may be used.

FIG. 8B illustrates an alternative embodiment of the rotation computation block 508-B which instead uses a modified wave difference method to determine the phase error signal $\epsilon_{phase}(k)$. In the embodiment of FIG. 8B, the rotation computation block 508-B comprises a matrix estimator 852, a cycle slip computation block 854, a WDM block 856, and a loop filter 858. The matrix estimator 852 operates similarly to the matrix estimator 802 described above but generates both a timing matrix $M_t(k)$ and a noisy timing matrix $\hat{M}_t(k)$. The timing matrix $M_t(k)$ is computed in the same manner described above. The noisy timing matrix $\hat{M}_t(k)$ is defined as the timing matrix $M_t(k)$ where $\beta=0$. Thus, the components of $\hat{M}_t(k)$ are given as:

$$\hat{M}_t^{(1,1)}(k)=p_{xx}(k)-jq_{xx}(k)$$

$$\hat{M}_t^{(1,2)}(k)=p_{xy}(k)-jq_{xy}(k)$$

$$\hat{M}_t^{(2,1)}(k)=p_{yx}(k)-jq_{yx}(k)$$

$$\hat{M}_t^{(2,2)}(k)=p_{yy}(k)-jq_{yy}(k) \quad (47)$$

The cycle slip computation block 854 generates a cycle slip number signal $\epsilon_{cs}(k)$ representing the detected number of cycle slips based on the timing matrix $M_t(k)$ in the same manner described above.

The WDM block 856 determines the phase error signal based on the in-phase and quadrature error signals from the in-phase and quadrature error computation block 506, the timing matrix $M_t(k)$, and the noisy timing matrix $\hat{M}_t(k)$ using a modified wave difference method. In this technique, the phase error signal is computed as:

$$\epsilon_{phase}=\epsilon_{MWDM}(k)= \quad (48)$$
$$\mathcal{I}\left\{e^{\frac{j\gamma(n)}{2}}[\hat{M}_t^{(1,1)}(k) \; \hat{M}_t^{(1,2)}(k) \; \hat{M}_t^{(2,1)}(k) \; \hat{M}_t^{(2,2)}(k)] \times \atop [M_t^{(1,1)}(k) \quad M_t^{(1,2)}(k) \; M_t^{(2,1)}(k) \; M_t^{(2,2)}(k)]^H \right\}$$

where $\mathcal{I}\{.\}$ denotes the imaginary part, $[.]^H$ denotes the complex conjugate and transpose, and $$\gamma(k)=\text{unwrap}\{\gamma(k-1),\arg(det\{M_t(k)\})\} \quad (49)$$

where $\gamma(k)\in[-2\pi, 2\pi)$ is the new unwrapped angle based on the old unwrapped angle and the new argument of the determinant. In more detail, $z=\text{unwrap}\{y, x\}$ computes the unwrapped angle $z\in[-2\pi, 2\pi)$ based on the inputs $y\in[-2\pi, 2\pi)$, $x\in[-\pi,\pi)$ by first adding a multiple of $2\pi$ to x to give an intermediate result in the range $[y-\pi, y+\pi)$, then adding a multiple of $4\pi$ to give a final result z in the range $[-2\pi, 2\pi)$. Note that $\gamma(k)$ is defined for the range $[-2\pi, 2\pi)$ because it is halved when computing the phase error. The initial value of $\gamma(k)$ can be set to 0.

The loop filter 858 operates similarly to the loop filter 808 described above.

Although the detailed description contains many specifics, these should not be construed as limiting the scope but merely as illustrating different examples and aspects of the described embodiments. It should be appreciated that the scope of the described embodiments includes other embodiments not discussed in detail above. For example, the functionality of the various components and the processes described above can be performed by hardware, firmware, software, and/or combinations thereof.

Various other modifications, changes and variations which will be apparent to those skilled in the art may be made in the arrangement, operation and details of the method and apparatus of the described embodiments disclosed herein without departing from the spirit and scope of the invention as defined in the appended claims. Therefore, the scope of the invention should be determined by the appended claims and their legal equivalents.

The invention claimed is:

1. A method for operating a receiver, comprising:
   receiving, by an optical front end, an optical signal from an optical communication channel;
   converting, by the optical front end, the optical signal to an analog electrical signal;
   sampling, by an analog front end, the analog electrical signal based on a sampling clock to generate a digital signal;
   generating, by a processor, a timing matrix representing coefficients of a timing tone detected in the digital signal, the timing tone representing frequency and phase of a symbol clock of the digital signal and the timing tone having a non-zero timing tone energy;
   computing a rotation control signal based on the timing matrix, the rotation control signal representing an amount of accumulated phase shift between the digital signal and the sampling clock; and
   controlling an oscillator to generate the sampling clock and to adjust at least one of the phase and frequency of the sampling clock based on the rotation control signal;
   demodulating the digital signal by the demodulator to generate a demodulated signal; and
   decoding the demodulated signal to generate a decoded output signal.

2. The method of claim 1, wherein generating the timing matrix comprises:
   applying a resonator filter to the digital signal to generate a band pass filtered signal;
   computing an in-phase and quadrature error signal based on the band pass filtered signal, the in-phase and quadrature error signal representing an amount of phase error in each of an in-phase component and a quadrature component of the digital signal; and
   computing the rotation control signal based on the in-phase and quadrature error signal.

3. The method of claim 2, wherein computing the in-phase and quadrature error signal comprises:
   applying an interpolator filter to the band pass filtered signal to generate an interpolated signal, the interpolated signal having a higher sampling rate than the band pass filtered signal;
   determining a correlation signal representing correlation measures between a first polarization of the interpolated signal and a second polarization of the interpolated signal; and
   determining the in-phase error and quadrature error signal based on a difference between the correlation measures for symbols of an in-phase component of the correlation signal separated by a half symbol period and based on a difference between the correlation measures for symbols of a quadrature component of the correlation signal separated by a half symbol period.

4. The method of claim 2, wherein computing the rotation control signal based on the in-phase and quadrature error signal comprises:
  determining the timing matrix based on the in-phase and quadrature error signal; determining based on the timing matrix, a cycle slip number signal representing a number of full symbol period shifts of the digital signal relative to the sampling clock;
  determining based on the timing matrix, a phase error signal representing a difference between a phase the digital signal and a phase of the sampling clock;
  applying a loop filter to the phase error signal to generate a filtered phase error signal; and
  generating the rotation control signal based on the cycle slip number signal and the filtered phase error signal, the rotation control signal to correct for the phase error and the number of full symbol period shifts of the digital signal relative to the sampling clock.

5. The method of claim 4, wherein determining the cycle slip number signal comprises:
  computing a determinant of the timing matrix; and
  generating the cycle slip number signal based on the determinant.

6. The method of claim 4, wherein determining the phase error signal based on the timing matrix comprises:
  computing a determinant of the timing matrix; and
  determining the phase error based on the determinant.

7. The method of claim 4, wherein determining the phase error signal based on the timing matrix comprises:
  applying a modified wave difference method to the in-phase and quadrature error signals and the timing matrix to generate the phase error signal.

8. The method of claim 2, wherein the applying the resonator filter comprises band pass filtering the digital signal around a frequency of approximately half of the symbol rate of the digital signal for each polarization of the digital signal.

9. The method of claim 1, wherein the digital signal comprises an impairment introduced in an optical channel including at least one: a half symbol period differential group delay, a cascaded differential group delay, a dynamic polarization mode dispersion, and a residual chromatic dispersion.

10. The method of claim 1, wherein the oscillator comprises a numerically-controlled oscillator.

11. A receiver, comprising:
  an optical front end to receive an optical signal from an optical communication channel and to convert the optical signal to an analog electrical signal;
  an analog front end the receive the analog electrical signal and to sample the analog electrical signal based on a sampling clock to generate a digital signal;
  an oscillator to generate the sampling clock;
  a digital signal processor to generate a timing matrix representing coefficients of a timing tone detected in the digital signal, the timing tone representing frequency and phase of a symbol clock of the digital signal and the timing tone having a non-zero timing tone energy, the digital signal processor further to compute a rotation control signal based on the timing matrix, the rotation control signal representing an amount of accumulated phase shift detected in the digital signal relative to the sampling clock, and to cause an oscillator to adjust at least one of the phase and frequency of the sampling clock based on the rotation control signal;
  a demodulator to demodulate the digital signal to generate a demodulated signal; and
  a decoder to decode the demodulated signal to generate a decoded output signal.

12. The receiver of claim 11, wherein the digital signal processor comprises:
  a resonator filter to filter the digital signal to generate a band pass filtered signal;
  an in-phase error and a quadrature error computation block to generate an in-phase and quadrature error signal based on the band pass filtered signal, the in-phase and quadrature error signal representing an amount of phase error in each of an in-phase component and a quadrature component of the digital signal; and
  a rotation computation block to compute the rotation control signal based on the in-phase and quadrature error signal.

13. The receiver of claim 12, wherein the in-phase and quadrature error computation block comprises:
  an interpolator filter to filter the band pass filtered signal to generate an interpolated signal, the interpolated signal having a higher sampling rate than the band pass filtered signal;
  a correlation computation block to generate a correlation signal based on the interpolated signal, the correlation signal representing correlation measures between a first polarization of the interpolated signal and a second polarization of the interpolated signal; and
  a difference computation block to generate the in-phase and quadrature error signal based on a difference between the correlation measures for symbols of an in-phase component of the correlation signal separated by a half symbol period, and based on a difference between the correlation measures for symbols of a quadrature component of the correlation signal separated by a half symbol period.

14. The receiver of claim 12, wherein the phase error computation block comprises:
  a timing matrix estimation block to generate the timing matrix based on the in-phase and quadrature error signal;
  a cycle slip computation block to determine based on the timing matrix, a cycle slip number signal representing a number of full symbol period shifts of the digital signal relative to the sampling clock;
  a phase error computation block to generate based on the timing matrix, a phase error signal representing a phase error of the digital signal relative to the sampling clock; and
  a loop filter to filter the phase error signal to generate a filtered phase error signal and to generate the rotation control signal based on the cycle slip number signal and the filtered phase error signal, the rotation control signal to correct for the phase error and number of full symbol period shifts of the digital signal relative to the sampling clock.

15. The receiver of claim 14, wherein the cycle slip computation block is further configured to:
  compute a determinant of the timing matrix; and
  generate the cycle slip number signal based on the determinant.

16. The receiver of claim 14, wherein the phase error computation block is further configured to:
  compute a determinant of the timing matrix; and
  determine the phase error based on the determinant.

17. The receiver of claim 14, wherein the phase error computation block is further configured to:

apply a modified wave difference method to the in-phase and quadrature error signals and the timing matrix to generate the phase error signal.

18. The receiver of claim 12, wherein the resonator filter comprises a band pass filter having a center frequency of approximately half of the symbol rate of the digital signal for each polarization of the digital signal.

19. The receiver of claim 11, wherein the digital signal comprises an impairment introduced by an optical channel including at least one: a half symbol period differential group delay, a cascaded differential group delay, a dynamic polarization mode dispersion, and a residual chromatic dispersion.

20. The receiver of claim 11, wherein the oscillator comprises a numerically-controlled oscillator.

* * * * *